July 6, 1926.
N. FULTON
CAKE BOARD
Filed Feb. 15, 1926
1,591,119
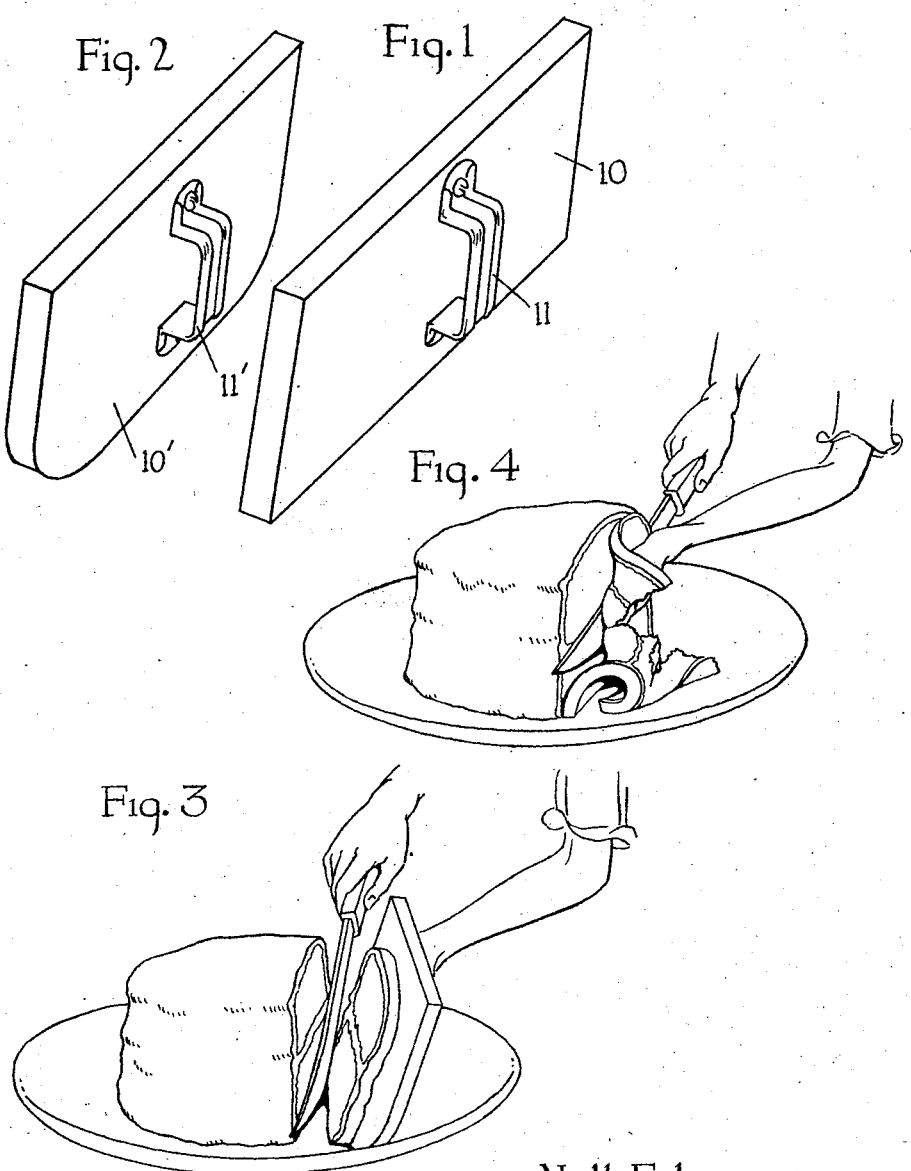
Nell Fulton INVENTOR.
BY Emil F. Langer
ATTORNEY Patented July 6, 1926.

1,591,119

UNITED STATES PATENT OFFICE.

NELL FULTON, OF NEW YORK, N. Y.

CAKE BOARD.

Application filed February 15, 1926. Serial No. 88,498.

My invention relates to cake boards, its object being the provision of a cake board which is simple in construction and manipulation, which can be produced and sold at a very low cost and which is sanitary and economical in the handling of cake and other pastries. Having in view these objects and others which will be mentioned in the following description, I will now refer to the drawings, in which—

Figure 1 is a view in perspective of one form of my cake board.

Figure 2 is a perspective view of a slightly modified form of the cake board.

Figure 3 is an illustration showing the manner in which the cake board is used when slicing cake.

Figure 4 is an illustration showing the difficulties encountered in cutting cake without using the cake board.

The cake board consists of a board proper 10 and a handle 11. The board 10 has one of its longer edges shaped to conform to the surface on which the cake rests. Cakes are often kept on flat surfaces, in which case the cake board illustrated in Figure 1 is the most suitable since either of its longer edges can be made to rest throughout its length on a flat surface. If the cake is in a plate the cake board shown in Figure 2 should be used since the rounded corners permit the larger portion of the lower edge to rest against the bottom of the plate. The form shown in Figure 2 may, however, be used on a flat surface by turning it over until its top edge as there shown is at the bottom. The form may be varied at will, but in general, the lower edge should be made to conform to the surface on which the cake rests.

The board may be made out of any suitable material. In my own experience I have found the three-ply veneer to be very satisfactory, although nearly any other kind of wood may answer the purpose as well. The board could also be stamped out of sheet metal and properly lacquered or plated to give it an attractive appearance. The handle 11 is preferably U-shaped and is positioned transversely to the board as shown in Figures 1 and 2. It is large enough to snugly receive three or four fingers.

The use of the cake board is illustrated in Figure 3. The board is held in one hand, with the fingers through the handle 11, against the surface of the cake. The slice of cake is cut with the knife held in the other hand, the knife and board being so manipulated that the slice is caused to fall against the board. After the slice is thus cut the board may be positioned horizontally with the slice of cake on top, and the slice may then be pushed off from the board onto a plate or it may be cut into strips which are shoved off individually by means of the knife and without the cake at any time coming into contact with the fingers. Contrast this now with the difficulties encountered in slicing the same cake without the use of the cake board as shown in Figure 4. The only hope of keeping the slice intact is in holding the hand against the edge, but this merely has the effect of defining the breaks without accomplishing anything more than the soiling of the hand. The slice of cake when served is badly broken and crumbled and it is unattractive in appearance. Much of the cake remains on the plate in the form of crumbs which are wasted.

The cake board affords a convenient means for slicing and handling the slices of other kinds of pastry besides cake. The need of such a device is greatest in handling cake because cake is apt to be soft, friable, and sticky, and I have therefore described my invention with reference to its use in handling slices of cake. Aside from the convenience of the cake board, its sanitary features are of prime importance. In cafeterias and restaurants it is possible to slice loaves of bread and to deposit the slices in the bread trays without once touching the bread.

Having thus described my invention in such full, clear, and exact terms that its construction and utility will be readily understood by others skilled in the art to which it pertains, what I claim as new and desire to secure by Letters Patent of the United States is:—

A cake board for retaining slices of cake intact during cutting, comprising a body board having a flat face for contact with the exposed surface of a cake to be sliced and having a bottom edge adapted to substantially conform to the surface supporting the cake and admit close contact between said flat face and substantially the entire area of said surface of the cake, and a handle secured across said body board at its outer side and intermediate its ends, said handle being looped outwardly from the body board to receive a substantial portion of the hand therethrough and admit positioning of the hand flat against the outer side of the body board in a natural position to directly press the flat face of the body board against the cake while cutting a slice therefrom, said handle also engaging over the exposed side of the hand to hold the body board thereto when the hand is turned upwardly for supporting and carrying the cut slice of cake directly on the body board.

In testimony whereof I affix my signature.

NELL FULTON.